United States Patent [19]

Shapiro et al.

[11] 4,078,105

[45] Mar. 7, 1978

[54] AUTOMOBILE RINSING FORMULATIONS AND PROCESS FOR USING THE SAME

[75] Inventors: Sydney Harold Shapiro, Chicago; Dale Howard Johnson, Downers Grove; Harold Charles Nemeth, Bolingbrook, all of Ill.

[73] Assignee: Akzona Incorporated, Asheville, N.C.

[21] Appl. No.: 768,930

[22] Filed: Feb. 15, 1977

[51] Int. Cl.$^2$ ............................ B05D 7/14; B05D 3/12
[52] U.S. Cl. ...................................... 427/417; 106/11; 106/285; 252/312; 252/357; 427/334; 427/444
[58] Field of Search ................ 252/312, 357; 427/334, 427/417, 444; 106/11, 285

[56] References Cited

U.S. PATENT DOCUMENTS

| | | | |
|---|---|---|---|
| 3,222,201 | 12/1965 | Boyle et al. | 252/312 X |
| 3,222,213 | 12/1965 | Clark | 427/348 |
| 3,551,168 | 12/1970 | Atherton et al. | 106/11 X |
| 3,756,835 | 9/1973 | Betty et al. | 106/11 |
| 3,955,986 | 5/1976 | Miller | 106/11 |

Primary Examiner—James R. Hoffman
Attorney, Agent, or Firm—Francis W. Young; Robert F. Green

[57] ABSTRACT

Improved rinsing formulations are disclosed which comprise an emulsifiable mineral oil, an organic cationic surfactant and a polyol. The formulations may be mixed with water to obtain oil-in-water emulsions which are especially suitable for use in automobile washing facilities.

16 Claims, No Drawings

AUTOMOBILE RINSING FORMULATIONS AND PROCESS FOR USING THE SAME

BACKGROUND OF THE INVENTION

This invention relates to a polish composition which is useful for treating cleaned painted surfaces, and a process for using the same. More particularly, this invention relates to a rinse type polish composition which is useful in automobile washing facilities for effecting a polish on the cleaned surfaces of vehicles, and a process for using the same.

In general, various rinse type polish compositions are known in the prior art. Background of the early investigations in this area may be obtained by referring to Soap and Chemical Specialties, February, 1962, page 72 et seq. U.S. Pat. No. 3,222,213 discloses a formulation which consists essentially of an organic cationic surfactant, an emulsifiable mineral oil and water. U.S. Pat. Nos. 3,497,365, 3,551,168, and 3,756,835 also disclose various improved polish formulations.

Many of the previous polish compositions have shown acceptable performance when commercially utilized in automobile washing facilities, but have been economically undesirable due to their relative high cost and the large amount of active ingredient necessary to accomplish acceptable performance. Thus, a need has existed for such compositions which show an acceptable performance at lower dosage levels of active ingredient.

SUMMARY OF THE INVENTION

It has now been found that by employing certain polyols in polish formulations containing an emulsifiable mineral oil and an organic cationic surfactant, a composition is obtained which may be utilized as a rinse type polish, especially suitable for use in automobile laundries. Such formulations accomplish acceptable performance at lower dosage levels of active ingredients, when compared to prior art compositions which do not contain a polyol.

DETAILED DESCRIPTION OF THE PREFERRED EMBODIMENTS

The polyols which are useful in the practice of the present invention are of two general categories. The first category includes diols which are normal or branched chain saturated or mono-ethylenically unsaturated aliphatic hydrocarbons containing from 2 to about 10 carbon atoms. The preferred diols of this category have the general formula

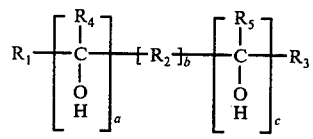

wherein $R_1$, $R_3$, $R_4$, and $R_5$ are independently selected from the group consisting of hydrogen and monovalent, straight or branched chain, saturated or mono-ethylenically unsaturated, aliphatic hydrocarbon radicals having from about 1 to 3 carbon atoms; $R_2$ is selected from the group consisting of divalent, straight or branched chain saturated or mono-ethylenically unsaturated aliphatic hydrocarbon radicals having from about 1 to about 3 carbon atoms; $a$, $b$, and $c$ are independently integers from 0 to 2; provided that the sum of $a + c =$ 2; the total number of carbon atoms being from 2 to about 10.

The second category of polyols includes saturated aliphatic diols which contain from 4 to about 15 carbon atoms and from 1 to about 4 ether linkages. The preferred diols of this category have the general formula

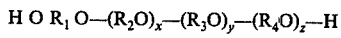

wherein $R_1$, $R_2$, $R_3$ and $R_4$ are divalent radicals independently selected from the group consisting of

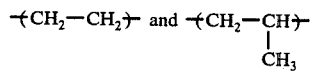

and $x$, $y$, and $z$ are 0 or 1.

Examples of the polyols of the first category include ethylene glycol, propylene glycol, 2-methyl-2,4-butanediol, 2-ethyl-1,3-hexanediol, 2-methyl-2,4-pentanediol, and 1,5-pentanediol.

Examples of the polyols of the second category include di-, tri-, and tetra- ethylene glycol and di-, tri-, and tetra- propylene glycol.

Especially preferred polyols are those of the first category and most preferred are the branched chain glycol type, 2-methyl-2,4-butanediol, 2-ethyl-1,3-hexanediol, and particularly 2-methyl-2,4-pentanediol.

The term emulsifiable mineral oil as used in this application means a paraffinic or naphthenic mineral oil having a viscosity in the range from about 20 to about 200 Saybolt Universal seconds (SUS) at 100° F. Mineral seal oil having a viscosity of about 40 SUS is the preferred emulsifiable mineral oil.

The cationic surfactants which are useful in the practice of the present invention may be fatty amido mono- or di- amines, imidazolines, or imidazolinium quaternaries, or di-fatty alkyl dimethyl quaternary ammonium salts. The term fatty acid or fatty alkyl as used in this application, means, respectively, a straight or branched chain saturated or mono-ethylenically unsaturated aliphatic carboxylic acid or hydrocarbon, containing from about 8 to about 18 carbon atoms.

Especially useful fatty amido amines have the formula

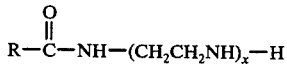

wherein R is a monovalent fatty alkyl group, and $x$ is 1 or 2.

Imidazolines which are especially preferred have the formula

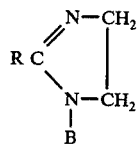

wherein R is a monovalent fatty alkyl group and B is selected from the group consisting of —H, $CH_3$, —$CH_2CH_3$, —$CH_2CH_2OH$, and —$CH_2CH_2NH_2$.

Imidazolinium quaternaries which are especially preferred have the formula

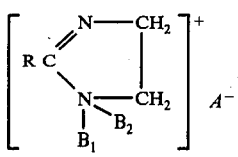

wherein R is a monovalent fatty alkyl group, $B_1$ and $B_2$ are independently selected from the group consisting of —$CH_3$, —$CH_2CH_3$, —$CH_2CH_2OH$, and —$CH_2CH_2NH_2$,

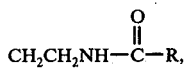

wherein R is as defined above and A is a halide, acetate, sulfate, ethosulfate, or methosulfate.

The di-fatty alkyl di-methyl quaternary ammonium compounds which are especially preferred have the formula

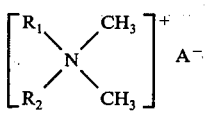

wherein $R_1$ and $R_2$ independently are selected from the group consisting of monovalent fatty alky groups, and A is a halide, acetate, ethosulfate or methosulfate.

For the cationic surfactant it is preferred to use a di-fatty alkyl dimethyl quaternary ammonium compound. Most preferred is dimethyldicocoammonium chloride.

The cationic surfactant and mineral oil which are useful in the present invention can be made to form an oil-in-water emulsion. Upon application to a cleaned painted surface the primary ingredients are deposited as a water-repellant film on said surface. The presence of a polyol, as defined above, in such an emulsion allows acceptable performance to be achieved with the use of a small amount of active ingredient in the emulsion.

In practice, a pre-emulsion concentrate is first made by mixing the emulsifiable mineral oil, the cationic surfactant, and the polyol. The components are usually combined so that the pre-emulsion concentrate contains from about 35 to about 70 percent emulsifiable mineral oil, from about 30 to about 50 percent cationic surfactant, and from about 4 to about 20 percent polyol. For both the cationic surfactant and the polyol, the components may be present as single species or as mixtures thereof. All percentages in this application are by weight unless indicated to be otherwise. Preferably, the concentrate will contain from about 40 to about 50 percent emulsifiable mineral oil, from about 40 to about 50 percent cationic surfactant and from about 6 to about 12 percent polyol. Obviously, broad ranges of the components may be utilized and the operability of compositions outside of the scope of the foregoing parameters is dependent primarily upon the specific components utilized and the condition of the water used in forming the subsequent emulsion. Also present in the pre-emulsion concentrate may be various amounts of impurities which do not substantially effect the operability of the concentrate, such as free amine, amine hydrochloride, water, and other production-related impurities. These impurities may be present up to a total of about 10 percent and typically are present in an amount from about 2 percent to about 8 percent.

The pre-emulsion concentrate may also contain from about 0 to about 10 percent, and more typically from about 7.5 to about 10 percent of a supplemental cationic surfactant which functions as an auxiliary emulsifier and reduces the turbidity that may be present in certain specific formulations. Usually the auxiliary emulsifier is a polyethoxylated fatty alkyl amine in which the fatty alkyl group contains from about 12 to about 18 carbon atoms and from about 2 to about 15 ethylene oxide moieties. Particularly preferred are bis(2-hydroxyethyl)tallowamine, polyoxyethylene (5) tallowamine, polyoxyethylene (15) tallowamine, and mixtures thereof. When the cationic surfactant utilized in the practice of the invention is an imidazoline compound, there should be present in the pre-emulsion concentrate one or more of the above mentioned polyethoxylated fatty alkyl amines, as described in U.S. Pat. No. 3,222,213. The amido amine compounds may require similar auxiliary emulsifiers or partial or complete neutralization with a short chain acid such as acetic.

An oil-in-water emulsion is formed from the foregoing pre-emulsion concentrate by admixing said concentrate with water in a weight ratio of concentrate to water of from about 1 to 800 to about 1 to 8000, preferably from about 1 to 3000 to about 1 to 6000.

A typical procedure for achieving the desired dilution of the oil-in-water emulsion in commercial establishments is to combine sufficient concentrate with water to form a preliminary emulsion containing from about 1 to about 4 percent concentrate. From about 2 to about 6 ounces of this emulsion is then continuously and uniformly combined with from about 1 to about 2 gallons of flowing water which is sprayed directly onto the cleaned surface.

The desired oil-in-water emulsion, as defined generally above, is applied, preferably by spraying, onto a cleaned painted surface, in an amount effective to produce beading on said surface, until a beading of water droplets on said surface is observed, and thereafter the droplets are removed from said surface. The foregoing process is an effective means for drying a cleaned surface.

The following examples are illustrative only and are not to be construed as limitations thereon. All percentages and proportions are by weight.

EXAMPLE I

A pre-emulsion concentrate is made by charging to a reactor dicocoamine, 2-methyl-2,4 pentanediol, mineral seal oil and sodium bicarbonate in a weight ratio of 10,000:2036:1303:180, respectively. The reactor is heated to 80°–85° C and methyl chloride, in a weight ratio of methyl chloride to dicocoamine of 32:100, is introduced at a temperature of 80°–85° C while maintaining a pH of 7–9 by the addition of sodium hydroxide if necessary. The reaction is terminated when the free amine and amine hydrochloride is less than 3 percent. The product is then cooled, filtered from by-product salt and diluted with mineral seal oil to produce a concentrate containing 43.2 percent dimethyldicocoammonium chloride, 8.5 percent 2-methyl-2,4-pentanediol, 4.3 percent water, 1–2 percent free amine and amine hydrochloride and 42–43 percent mineral seal oil.

EXAMPLE II

A pre-emulsion concentrate is made by combining the following components in the specified proportions:

| | |
|---|---|
| dimethyldicocoammonium chloride | 39.5% |
| mineral seal oil | 34.5 |
| free amine, amine hydrochloride, and water | 8.0 |
| 2-methyl-2,4 pentanediol | 8.0 |
| polyoxyethylene (5) tallowamine | 10.0 |

This example shows a rinse-type polish concentrate formulation of the type shown in Example I, with the addition of an auxiliary emulsifier.

COMPARATIVE EXAMPLE A

For purposes of comparison, a pre-emulsion concentrate is made by combining the following components in the specified proportions:

| | |
|---|---|
| dimethyldicocoammonium chloride | 31.2% |
| mineral seal oil | 56.4 |
| polyoxyethylene (5) tallowamine | 10.0 |
| free amine, amine hydrochloride, and water | 2.4 |

This examples shows a typical rinse-type polish concentrate formulation containing both a cationic surfactant, and an auxiliary emulsifier but with no polyol present.

COMPARATIVE EXAMPLE B

For purposes of comparison, a pre-emulsion concentrate is made by combining the following components in the specified proportions:

| | |
|---|---|
| dimethyldicocoammonium chloride | 39.7 |
| mineral seal oil | 56.9 |
| free amine, amine hydrochloride, and water | 3.4 |

The example shows a rinse-type polish concentrate formulation containing a cationic surfactant, but with no auxillary emulsifier or polyol present.

The foregoing concentrates were utilized in a commercial automobile laundry and the results are summarized in Table I. In the Table the concentration shown is of the preliminary emulsion which is subsequently further diluted with water when applied to the surface of cleaned automobiles. Approximately 4 ounces of the preliminary emulsion are combined with 1 to 2 gallons of flowing water and the resulting emulsion is sprayed on the cleaned automobiles.

The cars treated in such a manner had their appearance rated on a scale of 1-5, 1 representing a finish which exhibited superior beading, fastest water run off, and minimum towelling time. The ratings shown in parenthesis in Table I are derived from the same data as the ratings not in parenthesis, with the exception that new cars, which generally exhibit excellent finish quality, have been removed from consideration.

From the foregoing Table I, it is apparent that the compositions of Examples I and II exhibit performance which is superior to that of the other compositions, thus demonstrating the advantageous results obtainable from the compositions of the present invention. From Table I it is also apparent that for some specific compositions and water conditions, the presence of an auxiliary emulsifier may diminish the effectiveness of the compositions rinsing formulations.

TABLE I

| Composition of Example | % Concentration | | |
|---|---|---|---|
| | 4% | 2% | 1% |
| I | — | 2.2 | 2.6 |
| A | 2.6 (2.7) | 3.6 (3.8) | — |
| B | 2.0 | 3.5 (4.0) | 3.4 |
| II | 2.8 (3.0) | 3.1 (3.75) | 3.1 |

EXAMPLE III

A pre-emulsion rinse-type concentrate formulation is prepared having the following components and specified proportions:

| | |
|---|---|
| dimethyldicocoammonium chloride | 34.1% |
| mineral seal oil | 43.5 |
| polyoxyethylene (5) tallowamine | 10.0 |
| water | 6.0 |
| 2-methyl-2,4-pentanediol | 6.4 |

This formulation is a concentrate of the type within the scope of this invention, but having a supplemental cationic surfactant included in the formulation.

EXAMPLE IV

A pre-emulsion rinse-type concentrate formulation is prepared having the following components and specified proportions:

| | |
|---|---|
| dimethyldicocoammonium chloride | 45.5 |
| mineral seal oil | 44.7 |
| water, free amine, amine hydrochloride | 1.3 |
| 2-methyl-2,4-pentanediol | 8.5 |

This formulation is a typical concentrate of the type within the scope of this invention.

COMPARATIVE EXAMPLE C

A pre-emulsion rinse type concentrate having the following components and proportions is prepared:

| | |
|---|---|
| dimethyldicocoammonium chloride | 29.6% |
| polyoxyethylene (5) tallowamine | 9.0 |
| mineral seal oil | 51.5 |
| isopropanol and water | 9.9 |

The foregoing is representative of a commercially available composition.

COMPARATIVE EXAMPLE D

A pre-emulsion rinse-type concentrate having the following components and proportions is obtained from a commercially available source

| | |
|---|---|
| short-chain alcohol | 9 |
| mineral oil | 49 |
| ethoxylated fatty amine | 7 |
| trimethyl alkyl quaternary ammonium compound | 7 |
| water | 26 |

The foregoing compositions were evaluated in a commercial automobile laundry in accordance with the process described above for the Table I evaluations except approximately 6 ounces of concentrate were mixed with the 1-2 gallons of water. The results of the evaluation are shown in Table II.

TABLE II

| Composition of Example | Concentration | | | | |
|---|---|---|---|---|---|
| | ½% | 1% | 2% | 4% | 6% |
| III | — | 2 | — | 2 | — |
| IV | 5 | 2 | — | 2 | — |
| C | — | 5 | 4.5 | 3.5 | — |
| D | — | — | — | — | 4 |

From the foregoing comparisons in Table II it is apparent that the compositions of the present invention produce acceptable results at concentrations which are less than that necessary for other compositions, not containing a polyol.

What we claim is:

1. A pre-emulsion concentrate comprising
   (a) from about 35 to about 70 percent emulsifiable mineral oil;
   (b) from about 30 to about 50 percent cationic surfactant selected from the group consisting of fatty amido mono-or-di-amines, imidazolines, imidazolinium quaternaries, and di-fatty alkyl dimethyl quaternary ammonium compounds;
   (c) from about 0 to about 10 percent of auxiliary emulsifier selected from the group consisting of polyethoxylated fatty alkyl amine containing from about 2 to about 15 ethylene oxide moities, the fatty alkyl group containing from about 12 to about 18 carbon atoms and;
   (d) from about 4 to about 20 percent polyol selected from the group consisting of normal or branched chain saturated or mono-ethylenically unsaturated aliphatic diols containing from about 2 to about 10 carbon atoms and saturated aliphatic diols containing from 4 to about 15 carbon atoms and from 1 to about 4 ether linkages.

2. The pre-emulsion composition of claim 1 wherein the polyol is selected from the group consisting of diols of the formula

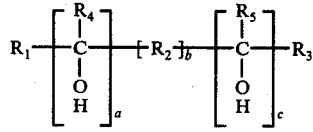

wherein $R_1$, $R_3$, $R_4$, and $R_5$ are independently selected from the group consisting of hydrogen and monovalent, straight or branched chain, saturated or mono-ethylenically unsaturated, aliphatic hydrocarbon radicals having from about 1 to 3 carbon atoms; $R_2$ is selected from the group consisting of divalent, straight or branched chain saturated or mono-ethylenically unsaturated aliphatic hydrocarbon radicals having from about 1 to about 3 carbon atoms; $a$, $b$, and $c$ are independently integers from 0 to 2; provided that the sum of $a + c = 2$; the total number of carbon atoms being from 2 to about 10; and diols of the formula

H O R₁ O—(R₂O)ₓ—(R₃O)ᵧ—(R₄O)ᵤ—H wherein $R_1$, $R_2$, $R_3$ and $R_4$ are divalent radicals independently selected from the group consisting of

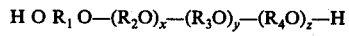

and $x$, $y$, and $z$ are 0 or 1.

3. The pre-emulsion concentrate of claim 2 wherein the cationic surfactant is selected from the group consisting of fatty amido amines of the formula

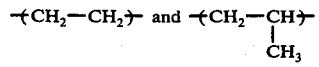

wherein R is a monovalent fatty alkyl group, and $x$ is 1 or 2; imidazolines of the formula

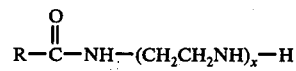

wherein R is a monovalent fatty alkyl group and B is selected from the group consisting of —H, —CH₃, —CH₂CH₃, —CH₂CH₂OH, and —CH₂CH₂NH₂; imidazolinium quaternaries of the formula

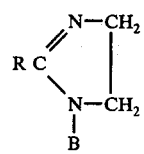

wherein R is a monovalent fatty alkyl group, $B_1$ and $B_2$ are independently selected from the group consisting of —CH₃, —CH₂CH₃, —CH₂CH₂OH, and —CH₂CH₂NH₂,

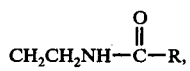

wherein R is as defined above and A is a halide, acetate, sulfate, ethosulfate, or methosulfate;

and di-fatty alkyl dimethyl quaternary ammonium compounds of the formula

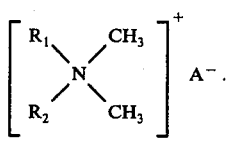

4. The pre-emulsion concentrate of claim 3 comprising from about 40 to about 50 percent of emulsifiable mineral oil, from about 40 to about 50 percent cationic surfactant and from about 6 to about 12 percent glycol.

5. The pre-emulsion concentrate of claim 4 wherein the emulsifiable mineral oil is mineral seal oil, the cationic surfactant is dimethyldicocoammonium chloride, the auxilliary emulsifier is polyoxyethylene (5) tallowamine and the polyol is 2-methyl-2,4-pentanediol.

6. An oil-in-water emulsion comprising from about 3000 to about 6000 parts of water per part of the pre-emulsion concentrate in claim 5.

7. An oil-in-water emulsion comprising of from about 3000 to about 6000 parts of water per part of the pre-emulsion concentrate of claim 4.

8. An oil-in-water emulsion comprising from about 800 to about 8000 parts of water per part of the pre-emulsion concentrate of claim 3.

9. An oil-in-water emulsion comprising from about 800 to about 8000 parts of water per part of the pre-emulsion concentrate of claim 2.

10. An oil-in-water emulsion comprising from about 800 to about 8000 parts of water per part of the pre-emulsion concentrate of claim 1.

11. A process for drying a cleaned painted surface comprising applying there to an oil-in-water emulsion comprising from about 800 to about 8000 parts of water per part of pre-emulsion concentrate comprising
   (a) from about 35 to about 70 percent emulsifiable mineral oil;
   (b) from about 30 to about 50 percent cationic surfactant selected from the group consisting of fatty amido mono-or-di-amines, imidazolines, imidazolinium quaternaries, and di-fatty alkyl dimethyl quaternary ammonium compounds;
   (c) from about 0 to about 10 percent of auxilliary emulsifier selected from the group consisting of polyethoxylated fatty alkyl amine containing from about 2 to about 15 ethylene oxide moities, the fatty alkyl group containing from about 12 to about 18 carbon atoms and;
   (d) from about 4 to about 20 percent polyol selected from the group consisting of normal or branched chain saturated or mono-ethylenically unsaturated aliphatic diols containing from about 2 to about 10 carbon atoms and saturated aliphatic diols containing from 4 to about 15 carbon atoms and from 1 to about 4 ether linkages, until a beading of water droplets on said surface is observed, and thereafter removing said droplets from the surface, said emulsion being effective to produce beading of water on said surface.

12. The process of claim 11 wherein the polyol is selected from the group consisting of diols of the formula

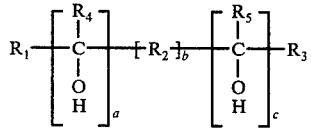

wherein $R_1$, $R_3$, $R_4$, and $R_5$ are independently selected from the group consisting of hydrogen and monovalent, straight or branched chain, saturated or mono-ethylenically unsaturated, aliphatic hydrocarbon radicals having from about 1 to 3 carbon atoms; $R_2$ is selected from the group consisting of divalent, straight or branched chain saturated or mono-ethylenically unsaturated aliphatic hydrocarbon radicals having from about 1 to about 3 carbon atoms; a, b, and c are independently integers from 0 to 2; provided that the sum of $a + c = 2$; the total number of carbon atoms being from 2 to about 10; and diols of the formula $$H O R_1 O-(R_2O)_x-(R_3O)_y-(R_4O)_z-H$$

wherein $R_1$, $R_2$, $R_3$ and $R_4$ are divalent radicals independently selected from the group consisting of

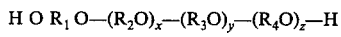

and x, y and z are 0 or 1.

13. The process of claim 12 wherein the cationic surfactant is selected from the group consisting of fatty amido amines of the formula

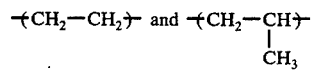

wherein R is a monovalent fatty alkyl group, and x is 1 or 2; imidazolines of the formula

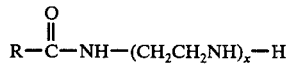

wherein R is a monovalent fatty alkyl group and B is selected from the group consisting of —H, —$CH_3$, —$CH_2CH_3$, —$CH_2CH_2OH$, and —$CH_2CH_2NH_2$; imidazolinium quaternaries of the formula

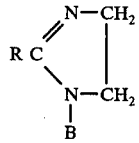

wherein R is a monovalent fatty alkyl group, $B_1$ and $B_2$ are independently selected from the group consisting of —$CH_3$, —$CH_2CH_3$, —$CH_2CH_2OH$, and —$CH_2CH_2NH_2$,

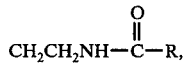

wherein R is as defined above and A is a halide, acetate, sulfate, ethosulfate, or methosulfate;
and di-fatty alkyl dimethyl quaternary ammonium compounds of the formula

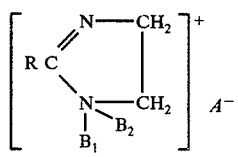

wherein $R_1$ and $R_2$ independently are selected from the group consisting of monovalent fatty alkyl groups, and A is a halide, acetate, ethosulfate or methosulfate.

14. The process of claims 13 wherein the concentrate about 50 percent of emulsifiable mineral oil, from about 40 to about 50 percent cationic surfactant and from about 6 to about 12 percent glycol.

15. The process of claim 14 wherein the emulsifiable mineral oil is mineral seal oil, the cationic surfactant is dimethyldicicoammonium chloride, the auxillary emulsifier is polyoxyethylene (5) tallowamine and the polyol is 2-methyl-2,4-pentanediol.

16. The process of claim 15 wherein the water-in-oil emulsion comprises from about 3000 to 6000 parts of water per part of pre-emulsion concentrate.

* * * * *